Figure 1:
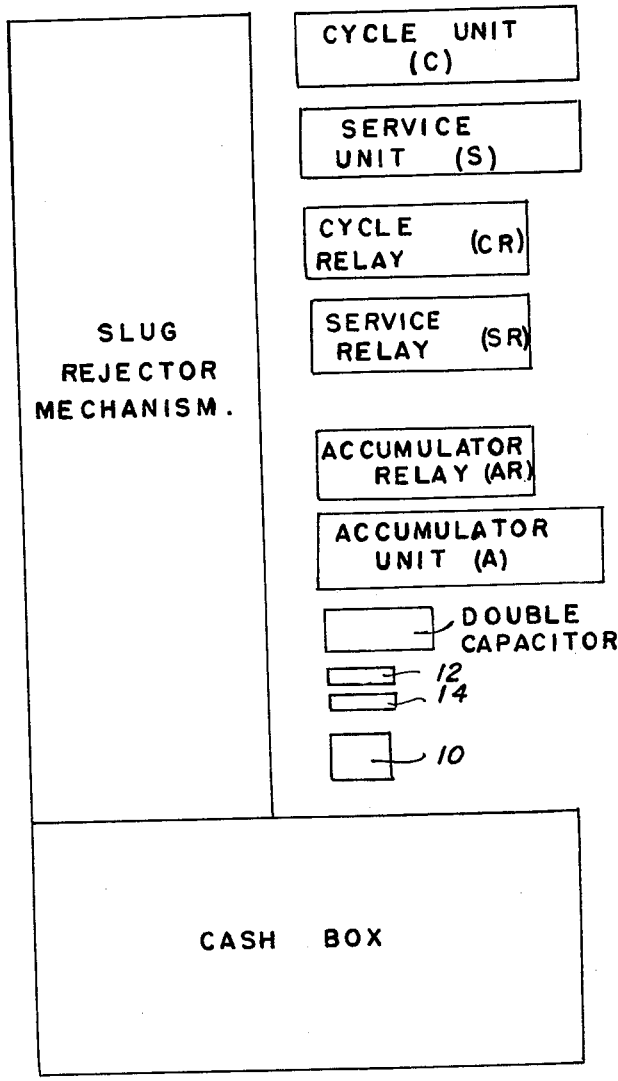

Aug. 6, 1963  G. V. SPOHRER  3,100,034
COIN CONTROLLED SERVICE VENDING SYSTEMS
Filed Oct. 10, 1960  3 Sheets-Sheet 1

INVENTOR
GEORGE V. SPOHRER

BY  E.F. Salter
ATTORNEY

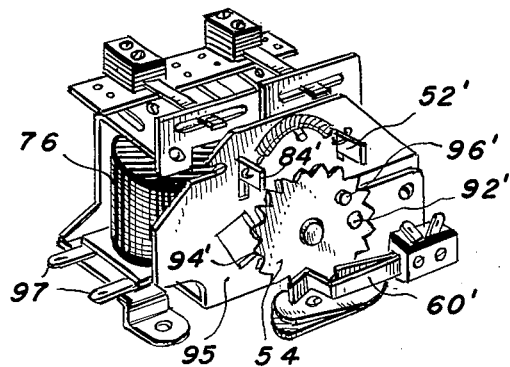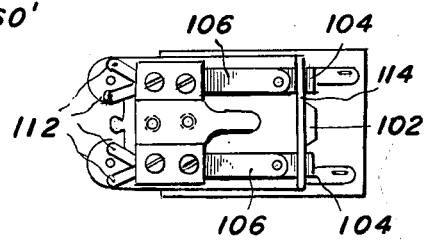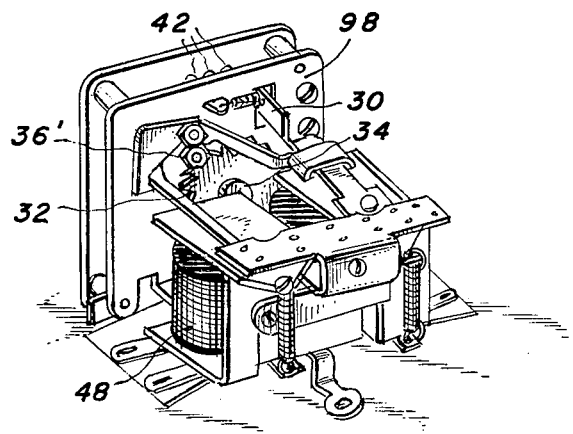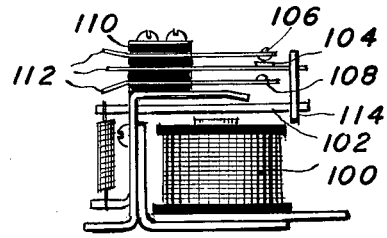

Aug. 6, 1963    G. V. SPOHRER    3,100,034
COIN CONTROLLED SERVICE VENDING SYSTEMS
Filed Oct. 10, 1960    3 Sheets-Sheet 3

INVENTOR.
GEORGE V. SPOHRER
BY
E. F. Dalter
ATTORNEY

United States Patent Office 3,100,034
Patented Aug. 6, 1963

3,100,034
COIN CONTROLLED SERVICE VENDING SYSTEMS
George V. Spohrer, 98 Dogwood Lane, Manhasset, N.Y.
Filed Oct. 10, 1960, Ser. No. 61,573
5 Claims. (Cl. 194—1)

This invention relates to coin controlled electrically operated control systems for automatic service vending machines, such as bowling pin setting machines.

The object of this invention is to provide means for receiving the price of one or more service cycles at one time, and for operating a service vending machine, such as an automatic pin setting machine to perform successively for the corresponding number of service cycles or games.

Another object is to provide an electrically controlled system of add-cancel or add-subtract units to operate the service vending machine for the required number of service cycles successively while performing the complete cycle of services during each cycle, as for example, setting up twelve frames and performing other related services per game cycle, in the case of a bowling pin setting machine.

A further object is to provide an electrical circuit for this system including an accumulator add-subtract unit for registering a service cycle credit impulse each time the number of coins of one or more denominations deposited amounts to the price of one service cycle, and for conveying such credit impulses to a cycle add-subtract unit to register the total number of credits in accordance with the amounts deposited, and a multi-service add-cancel unit for registering the performance of each service and conveying a cycle completion impulse at the end of each cycle to said cycle unit for reducing said total number by one until all the credits have been thus subtracted causing the system to turn off said machine after the last service in the last cycle has been performed.

A further object is to provide means in the above circuit for readily adjusting said accumulator unit for any cycle price range, as for example, between 25 and 60 cents per game per player for bowling, which may be varied in 5 cent steps, depending on the change in price for different alleys, seasons, players, etc.

A further object is to use the low voltage frame counter circuit of the automatic pin-setting machine, which normally operates the counter on the monitor's or manager's desk, to operate the service unit in the above system for registering the number of frames set up by the machine as long as the machine is turned on by any remaining credits registered in the cycle unit.

Figure 6:
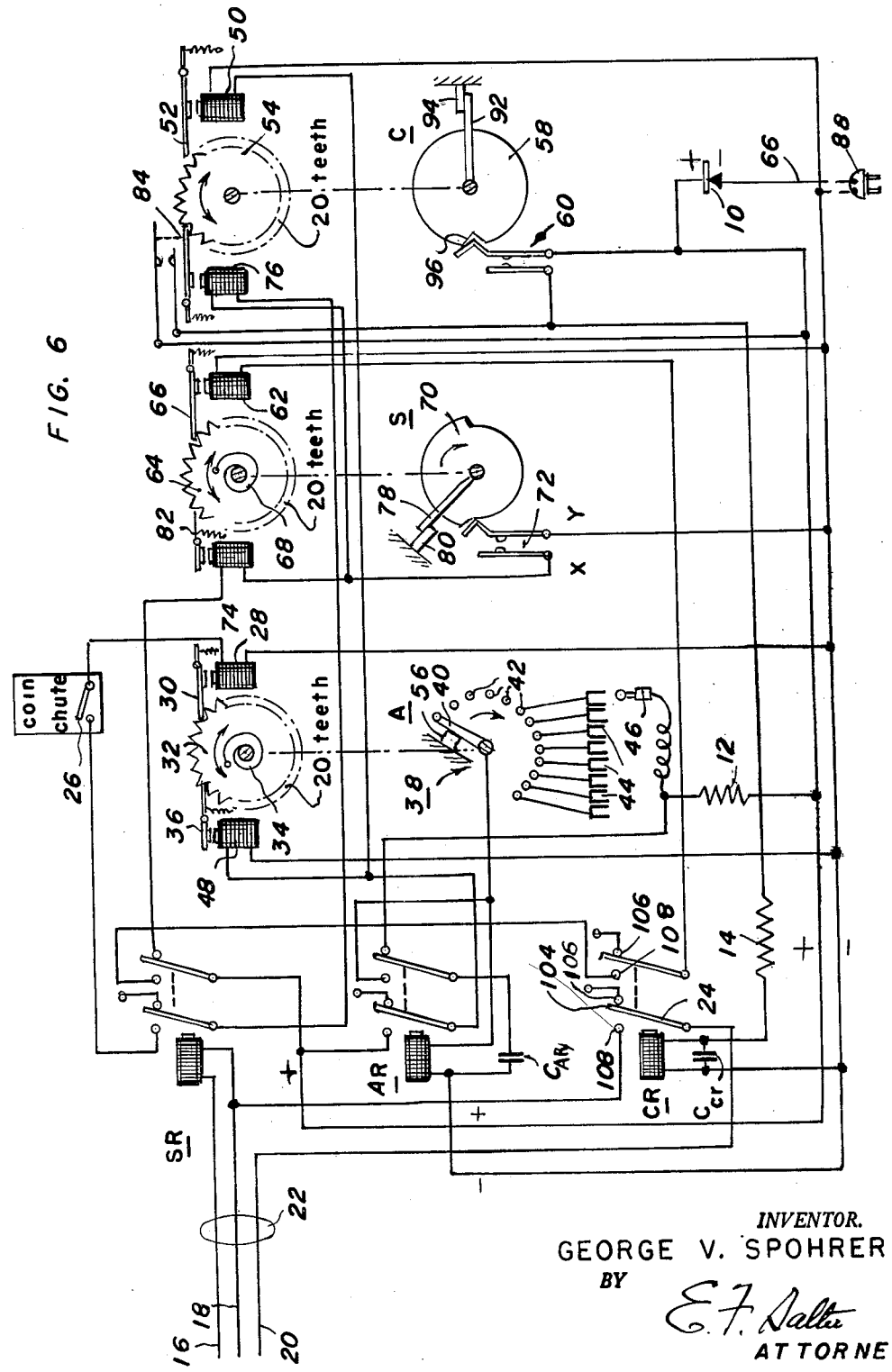

Other and more specific objects will become apparent in the following detailed description of a preferred form of the system applicable especially to an automatic bowling pin setting machine, as illustrated in the accompanying drawings, wherein:

FIG. 1 is an elevational view of the diagrammatic arrangement of the control system incorporated in an accumulator coin mechanism of known construction, having a standard coin rejector and cash box assembly, FIG. 2 is a perspective view of the cycle counting unit, FIG. 3 is a perspective view of the service counting unit, FIGS. 4 and 5 are top and side views, respectively, of one of the three relays used in the system, and FIG. 6 is a wiring diagram for this system.

The present adaptation of this control system to a standard coin-control device for association with automatic pin setting machines for bowling alleys provides a more accurate check on games actually played. Under present control systems and practices, there could well be many games overlooked by the monitor or manager, and hence not paid for.

Meters or registers under control of attendant or manager of alley are not entirely accurate and you cannot wholly rely on the meter nor the attendant. This device eliminates any fallacy or inaccuracy on the part of the meter or the attendant. There are also many cases in which the record as shown by the meter differs from that of the owner or manager of the bowling establishment. Furthermore, the adaptation of the present system allows the establishment to operate its business without the continuous attention of a particular person in assigning the alleys before the bowlers start to bowl and it eliminates the continuous attention of the same person or attendant when the bowler finishes bowling and tallys up his score to pay for it, thereby allowing this attendant to devote time to more managerial duties which necessarily means that the cost of help and/or operation is materially reduced.

Certain types of pin setters are leased to the owner of a bowling establishment. In such instances, meters are installed on the pin setting machines and the owning company takes a reading of these meters at various times and there has been found that they do not accurately coincide with the owner's record as to the number of games played. This would be the result of the bowler not marking down every frame that he bowled. Mischievous bowlers when finishing bowling walking out of the establishment without paying for their bowling cause further losses in revenue. Employees, friends of employees, etc. bowling free games and not making a record of the same, dishonest employees collecting from the customer for the games and not making a record of it and putting the money in their pockets instead of the cash register also are a source of significant business losses. It ha been observed by experienced bowling alley owners that there have been arguments between the person in charge and the bowler as to how many games the bowler had actually bowled and this has been a constant source of annoyance to the managers and grievance to the customers. All of these problems are eliminated by the use of the present control system.

The deposit required per game can be changed to allow for various priced games for which this control system may be used. The adaptation here illustrated will provide twelve complete pin setting operations per game for whatever price per game to which the system is adjusted. This is a sufficient number of complete pin setting operations or services to allow a regular game of bowling as prescribed by the American Bowling Congress even if the player makes a strike in the tenth frame and requires two additional pin settings for the next two balls. However, should it become desirable to change from twelve to any other number of services per game or cycle, this may be readily accomplished. Also this system will accept and register any amount of money that may be deposited at one time up to twenty games. In other words, whatever price the bowling proprietor decides to charge for each game of bowling or each twelve frames, he can adjust the controls accordingly. Also one or more bowlers can deposit nickels, dimes or quarters and the machine will accept these coins of different denominations and register credit for them up to the price of twenty games. For instance, the bowling proprietor adjusts the machine for fifty cents per game or twelve frames, one bowler or one or more bowlers can deposit as much as $10.00 in nickels, dimes and/or quarters and the machine will go on after the first fifty cents is deposited and will continue to operate while the total amount of $10.00 is being deposited and registered as 20 game credits. This will keep the machine in operation until these credits are used up.

What is meant by a frame of bowling is the following: A frame of bowling service is provided each time that the automatic pin setter sets up a complete set of ten pins.

If all the pins are knocked down with the first ball, the automatic pin setter will set up a completely new set of pins for the next frame. If the first ball does not knock down all the pins, the pin setting machine automatically picks up the remaining pins and resets them after sweeping the knocked down pins off the alley to complete the frame of bowling service.

This control system comprises an accumulator unit A, a cycle unit C and a service unit S operated by a standard 115 v. A.C. current which is polarized through a rectifier 10 and controlled by corresponding low voltage relays, AR, CR and SR respectively. Relays AR and CR may be operated from the same supply of polarized current through resistors 12 and 14. Relay SR is operated by the low voltage impulses normally delivered by the pin setting machine to the counter on the monitor's desk at the end of each frame operation through the lines 16 and 18 which are tapped into the counter circuit at the pin setting machine. A third line 20 is included in a cable 22 connected to the pin setting machine to enable the relay CR to control the operation of the pin setting machine through on-off switch 24 the terminals of which are connected to lines 20 and 18.

The units A, C and S each has a ratchet wheel of 20 teeth and a pair of operating solenoids, one for adding impulses by advancing its respective wheel one tooth for each impulse it receives, the other of the pair in the cycle unit for subtracting impulses it receives by reversing its wheel one tooth for each impulse, the other solenoids being for releasing a ratchet on their respective spring loaded wheels to reset them to zero setting whenever the solenoid receives an impulse, as hereinafter more fully explained.

Upon insertion of each 5 cents worth of coins the coin chute switch 26 closes to send one impulse to solenoid 28 which operates lever 30 so as to advance wheel 32 of the accumulator unit A one tooth against the tension of coil spring 34, the spring pressed pawl 36 catching in the next tooth against which it is spring pressed to stop the spring loaded wheel against reverse rotation. Switch 38 has a contact arm 40 on the shaft of wheel 32 and is rotatably advanced to slide from one contact 42 to the next, contacts 42 being spaced angularly at intervals corresponding to one tooth on the wheel or substantially at 18° intervals. The fifth to the twelfth contacts, not counting the first or zero contact 42, may be connected to a series of female plugs 44 for the purpose of receiving a male plug 46 which may be readily changed from one plug 44 to another in accordance with any change in the price to be required for the performance of one service cycle of the machine with which this coin controlled system is used. In the present illustration in association with a pin setting machine, if the price required for one game of 12 frames of pin setting is to be 25 cents, plug 46 is placed into the plug 44 connected to the fifth contact 42. If it is to be 60 cents, plug 46 would be moved to the twelfth plug 44. For any intermediate amount in 5 cent steps, it would be moved to the corresponding intermediate plug 44.

Whenever the proper amount in coins is inserted into the coin box to add up to the price of one game, switch arm 40 is moved to the contact 42 which is connected to the plug 44 which has the plug 46 in it. This completes the circuit through relay AR which in turn energizes solenoid 48 in unit A to operate pawl 36, and also energizes solenoid 50 in the cycle unit C to operate lever 52 for advancing the wheel 54 one tooth. The pawl 36 having released wheel 32, spring 34 returns the wheel and with it the switch arm 40 back against its stop 56 in readiness for registering any further coin deposits in the coin chute in payment for additional game credits to be similarly registered in the cycle unit C.

Wheel 54 is on the same shaft as switch operating cam 58 for closing switch 60 whenever wheel 54 is advanced one or more teeth up to its total capacity of 20 teeth. Switch 60 operates relay CR which closes the on-off switch 24 to turn on the operation of the pin setting machine.

Each time the pin setting machine performs one frame or service of automatic pin setting operations, it sends an impulse through lines 16 and 18 which operates relay SR. This relay in turn operates solenoid 62 to advance wheel 64 one tooth, through lever 66, against the tension of coil spring 68. Switch operating cam 70 being fixed to the shaft of wheel 64, is advanced correspondingly until the twelfth impulse operates relay SR. Cam 70 then reaches the position where it closes switch 72 to operate solenoids 74 and 76 for releasing the wheel 64 and cam 70 to the zero position of cam 70 as shown in FIG. 6, where the cam lever 78 is moved against stop 80 through the action of spring 68, as soon as the solenoid 74 lifts the pawl 82 out of engagement with the teeth on wheel 64. Solenoid 76 which is in parallel with solenoid 74, operates the subtract lever 84 which moves the wheel 54 one tooth in reverse direction to reduce the number of game or cycle credits registered in advancing the cam 58.

When the last credit registered is subtracted, the cam 58 moves into the zero position as shown in FIG. 6 and the switch 60 is opened, breaking the circuit operating the relay CR which results in opening on-off switch 24 to stop operation of the pin setting machine.

A cord 86 is provided with a plug 88 for connection to any house current outlet for supplying the power to the present control system through a rectifier 10 for polarizing the current used in this system which uses solenoids in the relays and the add-subtract and add-cancel units, which require polarized energization.

The 40 mf. capacitor $C_{AR}$ with a 5000 ohm resistor 12 in the accumulator relay branch provides a delay of about 2 seconds to make sure that the reset of the accumulator unit A is completed, in order to prevent cheating. The 100 mf. capacitor $C_{CR}$ with the resistor 14 in the cycle relay branch circuit provides a delay of about 5 seconds to make sure that the pin setting operation is completed.

The wiring diagram of FIG. 6 shows the mechanical operating elements of the several units in a schematic arrangement. Their actual cooperative relations and form are more clearly illustrated in FIGS. 2 and 5, where the corresponding elements are designated by like numerals.

In FIG. 2, the cycle unit is shown as constructed on a standard Guardian type stepper and has a normally closed switch 60' which is opened only in its starting position when the stop pin 92' extending from the rear surface of the toothed wheel 54 is stopped against an ear 94 extending from the frame plate 95. In this position, the projection 96' on the front surface of the wheel 54 is under the switch lever to hold it open, corresponding to the open position of switch 60 in the diagrammatic illustration of FIG. 6. The terminals for the coil of solenoid 76 are designated 97, similar terminals being provided on the other side of the unit for the other solenoid coil 50 (not shown).

In FIG. 3, the unit construction is based on another Guardian type stepper, the toothed wheel 32 of which is advanced by operating lever 30 and released by energization of the solenoid 48 to actuate the lever and pawl 36' into released position. The switch arm 40 is hidden from view behind the plate 98, and cooperates with contacts 42, only the uppermost of which are visible in FIG. 3. As already explained this same type of construction can be used for the service unit also.

The top and side views of a relay shown in FIGS. 4 and 5 illustrate a standard form diagrammatically indicated in the wiring diagram of FIG. 6. The single solenoid 100 operates spring pressed lever 102 from its normal position as shown in FIG. 5, when the middle contacts 104 are in contact with the upper contacts 106, to its lowered position when contacts 104 are moved away from contacts 106 and into contact with the lower contacts 108. The spring supports for the contacts are insulatedly mounted on posts 110 and have terminals 112 for circuit connections. Yokes 114 connect lever 102 with the middle contact supports.

It is to be understood that this control system, while illustrated as adapted to a bowling pin setting machine, is equally adaptable to other service vending machines, where the cycle of services may consist of just a dispensing of a single item like a package of cigarettes for any one price per package, or where it may consist a number of selected services at a predetermined price per cycle, like the preparing and dispensing of a beverage containing a selected mixture of ingredients, as e.g. coffee with or without cream and with or without sugar.

The accumulator unit may be adapted for any other price range than that illustrated, in the same way, and the steps may be 1 cent instead of 5, or in fact any amount desired, either less or more than 5 cents. The cycle unit may be adapted for a greater capacity by using a wheel 54 with more teeth. The service unit may be adapted also for any number of consecutive services or combinations of services comprising a complete cycle.

The greatest benefit from this control system is derived from its use in connection with automatic service performing machines that now require an overseer to check the amount of services used by the purchaser so as to collect the full revenue for all services received by him. This requires a lot of overseeing and/or monitoring equipment, and often raises a lot of disputes between management and customer, and encourages cheating by employees as well as customers.

In the case of bowling, under present conditions, where automatic pin setting machines are used, as already pointed out, a significant loss of revenue is thus sustained because of human error as well as calculated cheating by untrustworthy employees and customers. Since most automatic machines are leased on the basis of rigidly controlled automatic counters on the machines registering every performance of each machine, the profits from their operation can thus be unjustly reduced.

Coin operation with the present control system can eliminate all these losses and at the same time reduce the cost of overseeing work because no checking of the services rendered or even assignment of customers to the several alleys is required and one man can easily see to it that everything is running smoothly in any number of alleys, and needs merely to provide the customers with proper change for the required deposits in the coin chute. The system rigidly checks the number of games paid for and no machine is operated without being paid for in the correct amount. Teams requiring a certain number of games per player can prepay for all the games required up to 20 in each alley and will receive pin setting service on one or more alleys for an ample number of frames per game, equivalent to 12 frames per game per player. They can use the frames on alternate alleys or the same alley for each player, as they wish, and use any extra frames out of each 12 which they do not need for completion of any games, for practice rolls or even for an extra game if they have enough of such extra frames left over after completing their regular set.

Additional amounts may be deposited any time and will be registered as cycle or game credits up to the capacity of 20 in unit C, without interruption of the operation of the other units.

While a specific form of this control system is illustrated, using specific elements and arrangements, many obvious modifications therein may be made without departing from the spirit and scope of this invention, as defined in the appended claims.

For example, in place of the coin operated switches 60 and 72 a switch with a rotating contact arm, similar to 40 in the accumulator unit A, could be used and connected to one of the switch terminals, and the other switch terminal could be connected to appropriate annularly arranged contacts similar to 42.

The male and female selective plug connections 44 and 46 could be substituted by a dial type multi-position contact switch of well-known construction, etc.

What is claimed is:

1. In a coin controlled electrical control system for service vending machines, such as automatic pin setting machines, the combination of an accumulator unit for closing a switch in response to the deposit of a sufficient number of coins for one cycle of service operations to be performed by the machine, a cycle register unit operated in response to each closure of said switch to register one cycle of service operations by said machine, a service unit operated in response to the completion of each pin setting operation of said machine to count up to the total number of services constituting one cycle and to then close a cycle switch for operating said cycle unit in reverse direction to register one less cycle credits, and a service switch for turning on the automatic operation of said machine for successive cycles of service operations in response to the registration of one or more cycle credits still remaining in said cycle unit, each of the three units including a toothed wheel and a pair of solenoids, one of said pair of solenoids operating a lever for advancing the corresponding wheel one tooth each time said one solenoid is energized, said accumulator switch being operated by the wheel of the accumulator unit after it is advanced a predetermined number of teeth corresponding to a multiple of a basic value that said sufficient amount is set for, and means for changing said predetermined number in accordance with any desirable change in the price of one cycle of services to be performed by said machine.

2. The combination of claim 1, said accumulator wheel being spring loaded against a stop in starting position and having a spring-pressed pawl cooperating with the toothed wheel to hold it in advanced positions against its spring load, the other of said pair of solenoids in the accumulator unit being energized in response to the closure of the accumulator switch to release said pawl and return said wheel to its starting position.

3. The combination of claim 2, said cycle wheel having control means for maintaining said service switch open when no cycle credit is registered and the wheel is in its zero position, and for turning the service switch on when the wheel is advanced one or more teeth to register one or more cycle credits, said service unit wheel being spring loaded against a stop in starting position and having a spring-pressed pawl cooperating with its teeth to hold it in advanced positions against its spring load, the other of said pair of solenoids in the service unit being energized in response to the closure of the cycle switch upon advance of said service unit wheel a predetermined number of teeth corresponding to the number of pin setting services a complete cycle is set for, said other solenoid being energized to release said wheel in the service unit to starting position while at the same time said cycle switch operates said cycle unit one tooth in reverse.

4. The combination of claim 3, said cycle unit wheel having an operating lever for reverse operation one tooth at a time, said other solenoid in said cycle unit being energized by closure of said cycle switch in said service unit to actuate said reverse operating lever.

5. The combination of claim 4, said service switch control means including a normally open switch closed in response to the registration of one or more cycle credits in said cycle unit, a second normally open switch in parallel connection to said first normally open switch, and means for closing said second switch in response to operation of said reverse operating lever.

References Cited in the file of this patent
UNITED STATES PATENTS

| | | |
|---|---|---|
| 2,118,303 | Hehn | May 24, 1938 |
| 2,231,255 | Collins | Feb. 11, 1941 |
| 2,649,947 | Nelsen | Aug. 25, 1953 |
| 2,800,988 | Timms | July 30, 1957 |